J. L. BERNARD.
CHUCK.
APPLICATION FILED APR. 20, 1915.
1,154,283.
Patented Sept. 21, 1915.
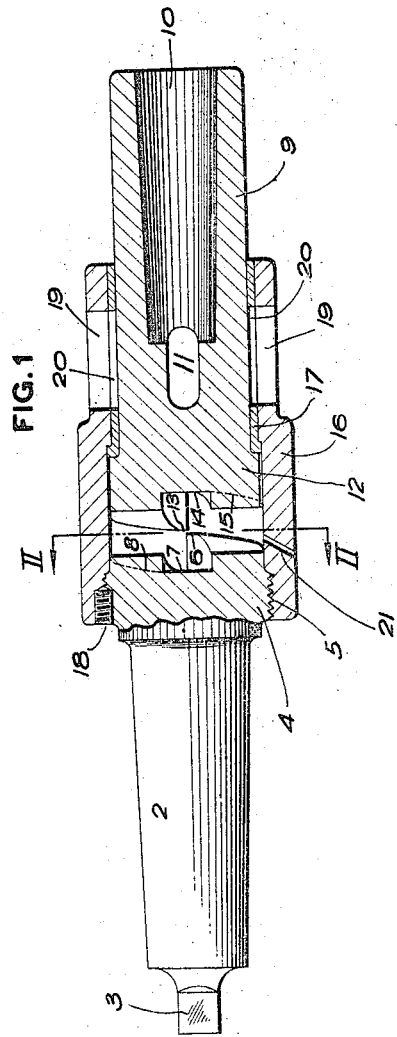
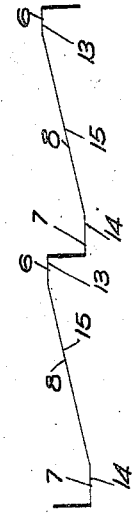
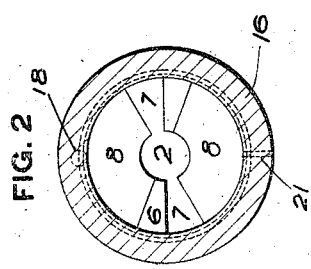
WITNESSES
INVENTOR
James L. Bernard

UNITED STATES PATENT OFFICE.

JAMES L. BERNARD, OF BEAVER, PENNSYLVANIA.

CHUCK.

1,154,283.  Specification of Letters Patent.  Patented Sept. 21, 1915.

Application filed April 20, 1915. Serial No. 22,582.

*To all whom it may concern:*

Be it known that I, JAMES L. BERNARD, a citizen of the United States, residing at Beaver, in the county of Beaver and State of Pennsylvania, have invented certain new and useful Improvements in Chucks, of which the following is a specification.

My invention relates to the class of tools used in attaching a drill or other rotating tool having a tapered shank to the driving spindle of a drill press or similar rotating machine tool.

Heretofore it has been the general practice to directly attach the drill to the spindle of a machine tool in such manner that the drill is at all times positively rotated by the rotating spindle, and as a result serious accidents to the workmen have occurred by reason of the clothing of the workman becoming entangled in the rotating drill, in some cases even the hands or fingers of the workman being caught or fastened and serious injury resulting therefrom.

One object of my invention is to provide a chuck of novel construction having improved means whereby a drill or similar tool, without being removed from the spindle of the machine, is disconnected therefrom when the tool is not in cutting engagement with the material being drilled or machined.

Another object of my invention is to provide a chuck having improved means whereby the tool is mechanically connnected and disconnected from the spindle in the operation of the machine tool.

A further object of my invention is to provide a chuck having novel means whereby rotation of the tool by the spindle of the machine is prevented when the tool is disengaged from the material being or to be operated upon by the drill or other rotary tool.

Still further objects of my invention will become apparent as will be more fully described hereinafter and specifically pointed out in the appended claims.

Referring to the drawings forming part of this specification, Figure 1 is a plan, partly in section, showing a drill chuck constructed and arranged in accordance with my invention. Fig. 2 is a transverse section on the line II—II of Fig. 1 showing the construction of the opposed jaws forming part of my improved chuck. Fig. 3 is a development of the jaws shown in Figs. 1 and 2.

In the drawings, the numeral 2 designates the shank of a chuck having a tang 3 of the usual construction. The shank as made has the usual standard Morse taper and its lower end is provided with an enlarged portion 4 having screw threads 5 on its periphery. The enlarged cylindrical end 4 of the shank 2 is provided with jaw faces, these jaw faces having high portions 6, 6, connected to low portions 7, 7, by inclined portions 8, 8. Opposite the shank 2 is the socket 9 of the chuck having a tapered axially extending recess 10 in its outer end which is bored to the standard Morse taper to receive a correspondingly tapered shank of the drill or other tool. The inner end of the recess 10 opens into or is connected to a transverse slot 11 which forms a recess to receive the flattened tang of the tool and positively connect the socket end of the chuck with the tool. This slot also affords means for the insertion of a drift or other tool in removing the tool from the chuck. The inner end 12 of the socket 9 is enlarged in diameter and this enlarged end is provided with jaw faces having high portions 13, 13, connected to low portions 14, 14, by inclined portions 15, 15, similar to those on the end of the shank 2. The socket 9 is mounted so as to rotate and also to move lengthwise in a tubular sleeve 16, this sleeve being provided with a bushing 17 and having an internally threaded end by which the sleeve is secured on the enlarged screw threaded end of the shank 2. A threaded pin 18, positioned in a threaded hole, which is formed partly in the sleeve and partly in the enlarged end 4 of the shank, prevents relative rotation of the shank 2 and sleeve 16 when these parts are in assembled position. The outer end of the sleeve 16 is provided with opposite transverse slots or openings 19, and similar slots or openings 20 in the bushing 17 register with the openings 19 so as to provide means for insertion of a drift or other tool in removing the drills when the socket 9 is turned to register the transverse slot 11 therein with the slots 19 and 20. The inclined opening 21 in the upper end of the sleeve 16 provides means for supplying lubricant to the interior of the sleeve of the chuck.

In the operation of my improved chuck, its shank 2 is inserted in the spindle socket of a drill press or machine tool in which the spindle extends lengthwise vertically. The shank of a drill or other tool is then inserted in the tapered recess 10 in the socket end 9 of the chuck with the tang of the tool within the transverse slot 11. The drill spindle is then started to rotate and the spindle, chuck and drill are lowered so as to bring the lips of the drill into engagement with the material to be drilled. Continued lengthwise movement of the spindle then brings the jaw faces 6, 7 and 8 of the shank 2 into engagement with the jaw faces 13, 14 and 15 of the socket end 9 of the chuck, so that the tool in the socket 10 is positively rotated with the shank 2 as long as the drill remains in cutting engagement with the material being drilled. The drill is then fed forwardly or lengthwise while being rotated until a hole of the required depth is formed by the tool, and the spindle of the drill press is then raised so as to lift the drill from the so-formed recess or hole. Ordinarily, the spindle is permitted to rotate while the drill is being moved into position to drill the next hole or opening in the material being operated upon, and it is in such situations that liability of accident to the workmen arises. When the spindle is lifted to withdraw the drill from an opening which has just been formed, the weight of the drill and socket end 9 of the chuck will cause the socket end 9 to move lengthwise in the annular sleeve so as to disengage the jaw faces 6, 7 and 8 from the jaw faces 13, 14 and 15. When the jaws are disengaged there is no positive connection between the shank 2 and socket 9 of the chuck, as is the case when the drill is not in cutting engagement with the material being cut. Should the clothing, or hands, of the workman become entangled with the drill or socket end of the chuck when in this position, the drill will not rotate, although the spindle on which the chuck is mounted and the shank of the chuck may be positively rotating, and in this way the safety of the workman in using the drills with my improved chuck is insured.

The advantages of my invention will be apparent to those skilled in the art. The apparatus is simple and easily kept in repair. By the use of my improved chuck the danger of injury to the workman is lessened and overcome.

Modifications in the construction and arrangement of the parts may be made without departing from my invention as defined in the appended claims.

I claim:—

1. A chuck comprising a shank having a screw threaded end, an annular sleeve having internal screw threads engaging the screw threaded end of said shank, a pin to prevent relative movement of the shank and sleeve, a socket mounted in said sleeve to rotate and move axially lengthwise, and jaws on the opposite ends of said shank and socket arranged to engage and positively connect the socket to the shank in using the chuck.

2. A chuck comprising a shank having a screw threaded end, an annular sleeve having internal screw threads engaging the screw threaded end of said shank, a socket mounted in said sleeve to rotate and move axially lengthwise, and jaws on the opposite ends of said shank and socket arranged to engage and positively connect the socket to the shank in using the chuck.

3. A chuck comprising a shank having a recess therein, a socket mounted in said recess to rotate and move axially lengthwise, and jaws on the inner end of the recess and adjacent end of said socket arranged to engage and positively connect the socket to the shank in using the chuck.

In testimony whereof I have hereunto set my hand.

JAMES L. BERNARD.

Witnesses:
A. C. METTLER,
B. O. BATEMAN.

Copies of this patent may be obtained for five cents each, by addressing the "Commissioner of Patents, Washington, D. C."